R. D. JOHNSON.
CLOTHESLINE.
APPLICATION FILED DEC. 1, 1919.
1,352,273.
Patented Sept. 7, 1920.
2 SHEETS—SHEET 1.
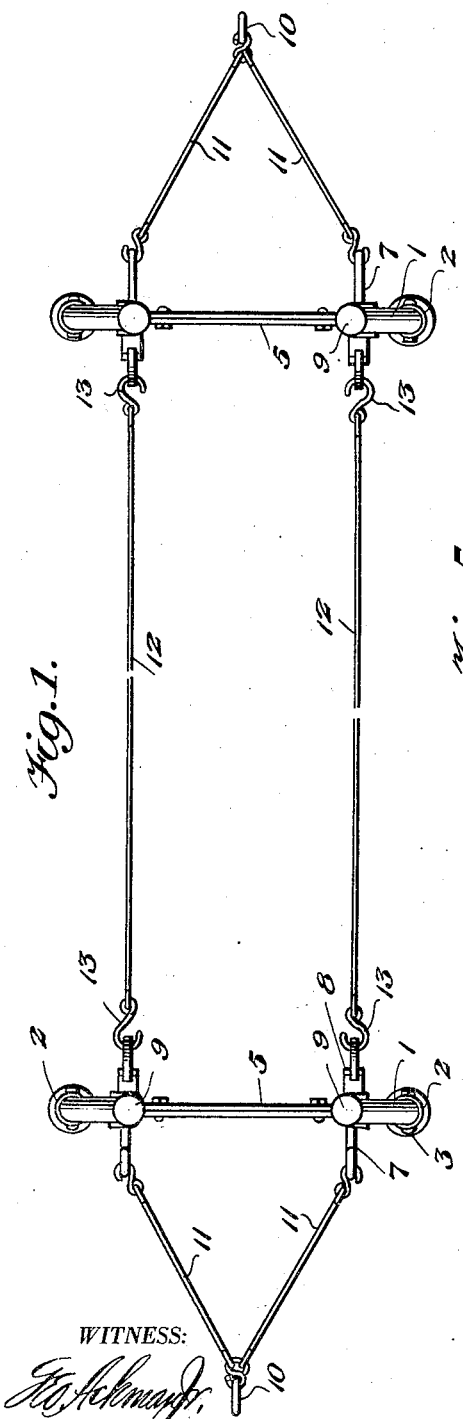
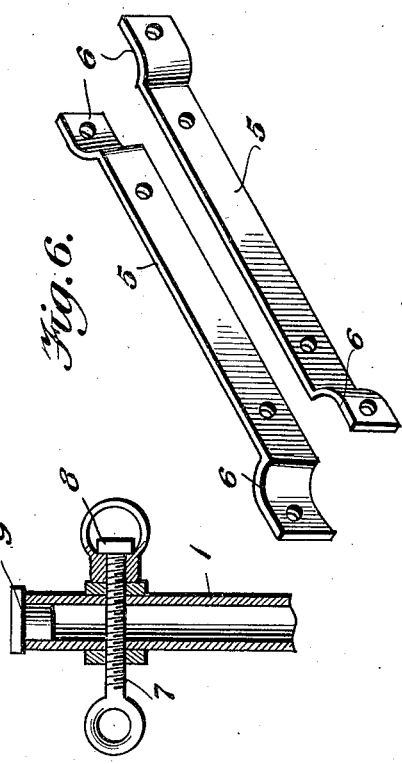
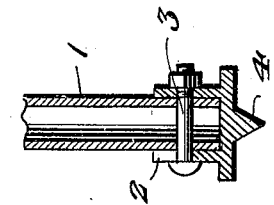
R. D. Johnson
INVENTOR.
BY Victor J. Evans
ATTORNEY.

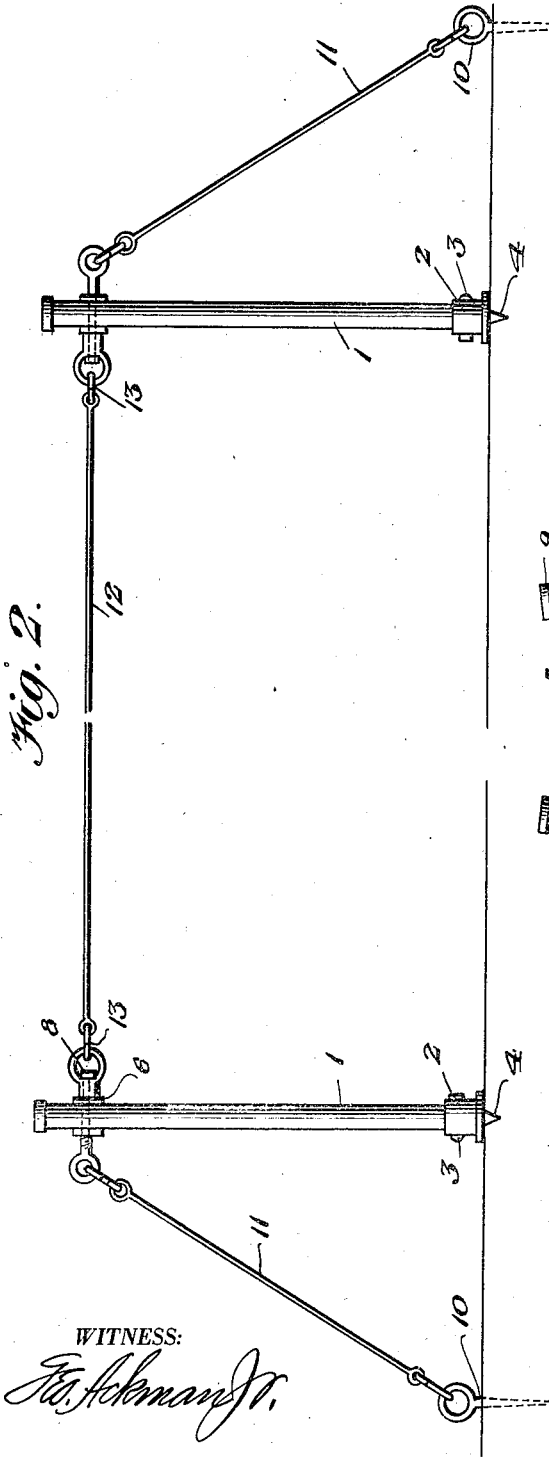
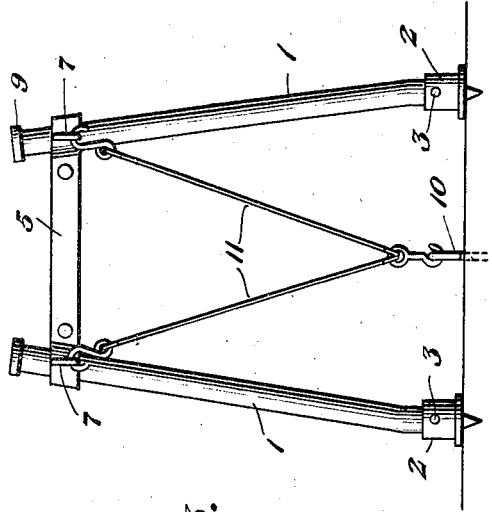

UNITED STATES PATENT OFFICE.

RALPH D. JOHNSON, OF FAIRBURY, ILLINOIS.

CLOTHESLINE.

1,352,273.     Specification of Letters Patent.     Patented Sept. 7, 1920.

Application filed December 1, 1919. Serial No. 341,633.

*To all whom it may concern:*

Be it known that I, RALPH D. JOHNSON, a citizen of the United States, residing at Fairbury, in the county of Livingston and State of Illinois, have invented new and useful Improvements in Clotheslines, of which the following is a specification.

This invention relates to improvements in clothes lines and the principal object of the invention is to provide means whereby the line may be easily and quickly set up in the yard or upon a roof.

Another object of the invention is to provide means whereby the tension on the line may be adjusted.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view showing the invention set up in a yard.

Fig. 2 is a side view.

Fig. 3 is an end view.

Figs. 4 and 5 are sectional views of one of the posts.

Fig. 6 is a view of the cross pieces.

As shown in these views I provide four tubular posts 1 which have their lower ends seated in socket members 2 and secured therein by the bolts 3. The socket members are provided with the points 4 for being driven into the ground or the roof, when the device is used upon the roof. I arrange a pair of posts at each end and the posts of each pair are connected together adjacent their upper ends by the cross-pieces 5. Each cross-piece is formed of two metal strips bolted together and having their ends spaced apart to form the forks 6, said forks embracing the posts and being held to the post by the eyebolts 7 which pass through holes in the posts. An eye nut 8 engages the projecting screw threaded end of each bolt. Each post, at a slight distance above the socket member, is bent so that the two posts converge, as shown in Fig. 3. The upper ends of the posts are provided with cap members 9. Screw stakes 10 are driven into the ground beyond the posts and bracing wires 11, having hooks at their ends, extend from the eyes of the bolts 7 to said stakes. The clothes lines 12 are preferably formed of wire with hooks 13 at their ends, these hooks engaging the eyes 8.

It will thus be seen that the two clothes lines are firmly anchored by the posts and the brace wires. Any slack in the lines will be taken up by shortening the brace wires 11 or adjusting the bolts 7. The device may be easily and quickly set up or taken down by detaching the hooks from the various parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising two pairs of posts, each post having its lower part provided with a spiked end, a pair of cross pieces for holding the posts of each pair in spaced relation, said cross pieces being clamped to the post, eye bolts carried by said post and a pair of clothes lines connected with the eye bolts.

In testimony whereof I affix my signature

RALPH D. JOHNSON.